Patented Feb. 23, 1954

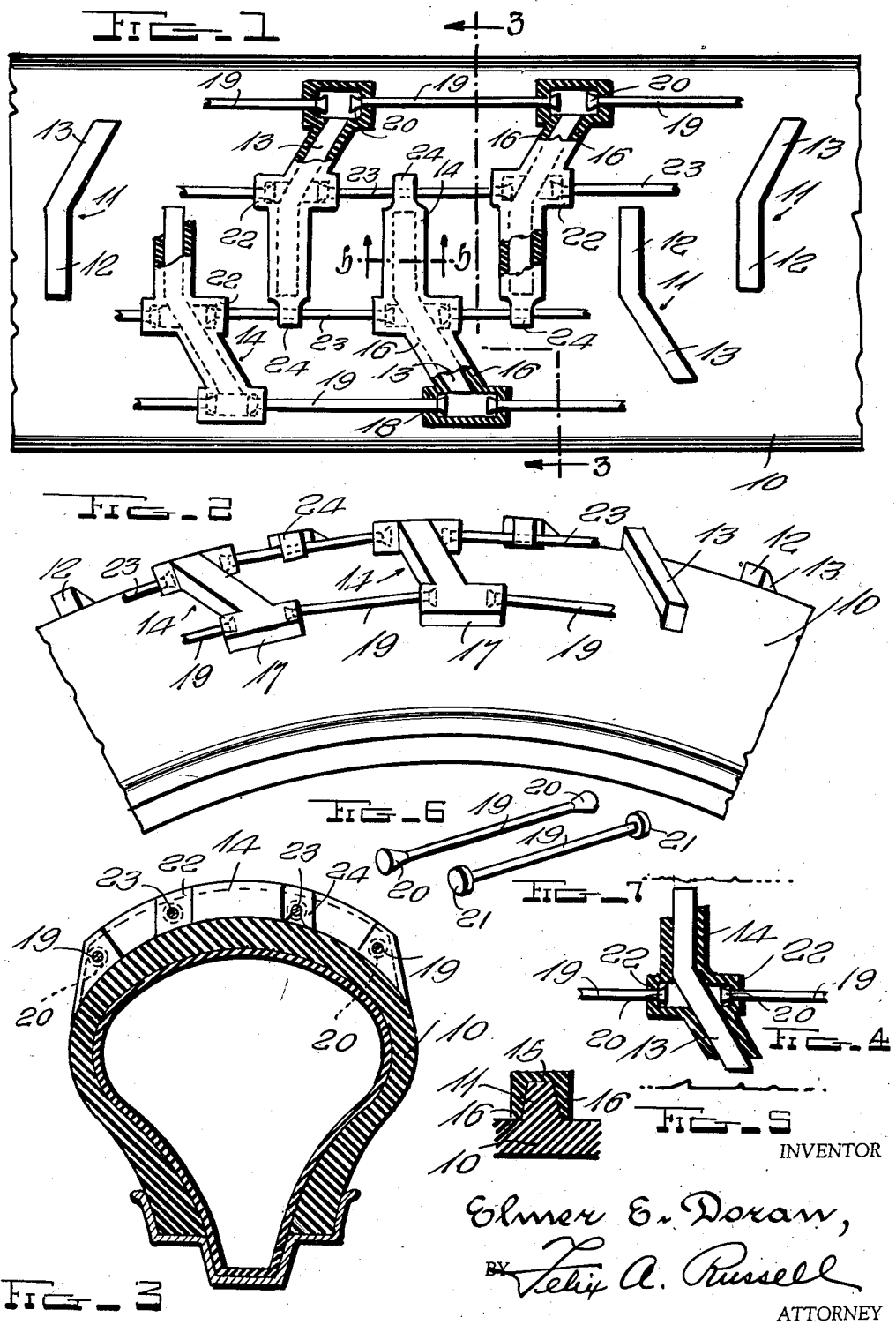

2,670,023

UNITED STATES PATENT OFFICE 2,670,023

TIRE CLEAT PROTECTOR

Elmer E. Doran, Merced, Calif.

Application April 23, 1951, Serial No. 222,330

1 Claim. (Cl. 152—184)

The present invention relates to a tire cleat protector and it consists in the combinations, constructions and arrangements of parts herein described and claimed.

Generally the invention comprises a device which may be mounted upon tires, particularly tractor tires and the like, after the cleats of the same have become partially worn away. The device provides traction equal to that of a new tire and the use of the device will enable the tractor user to employ his tires for the life of the tire carcass. The device is so constructed that individual steel caps forming a part of the invention may be replaced or built up by welding from time to time when necessary and the device also embodies a novel linkage which forms a part of the invention.

It is accordingly an object of the invention to provide a device of the character set forth which is simple in construction, easy to assemble and disassemble, inexpensive to manufacture and yet effective and efficient in use.

Another object of the invention is the provision of a novel means for increasing the traction of worn tires.

A further object of the invention is the provision of a novel cap member forming a part of the invention.

Another object of the invention is the provision of novel links forming parts of the invention.

Other and further objects of the invention will become apparent from a reading of the following specification taken in conjunction with the drawing, in which:

Figure 1 is a fragmentary plan view of an embodiment of the invention, partly broken away, showing the same mounted upon a tractor tire, Figure 2 is a side elevational view thereof, Figure 3 is a sectional view taken along line 3—3 of Figure 1, Figure 4 is a fragmentary plan view, partly in section, illustrating the manner of attachment of certain links forming a part of the invention, Figure 5 is an enlarged fragmentary sectional view taken substantially along line 5—5 of Figure 1, and Figures 6 and 7 are perspective views of certain links forming part of the invention.

Referring more particularly to the drawing, there is shown therein a tire carcass 10 provided with cleats 11 which, in the present instance, each consists of a transversely extending portion 12 which lies centrally upon the periphery of the carcass 10 and an angularly extending portion 13 which forms a continuation of the transversely extending portion 12, it being understood that the portions 13 are formed at either side of the central portion of the tire.

The device forming the present invention consists of a plurality of cleat protector plates generally designated at 14 and each being of inverted U-shaped cross sectional area, as fully indicated at Figure 5 of the drawing. Each of the protectors 14 comprises a bight portion 15 and a pair of dependent legs 16 and each of the protectors 14 is adapted to encompass one of the cleats 11, it being understood that the protectors 14 may be shaped to fit the particular shape of the cleat members of a particular tire.

In the present case, since the portions 13 of the cleats 11 extend alternately in opposite directions, one end of the protector 14 which is adapted to be positioned upon the side of the tire is enlarged, as indicated at 17, and the enlarged portion 17 is provided upon its ends with openings 18 through which flexible cable links 19 extend. The links 19 are provided with heads at either end which may be frustro-conical in shape, as indicated at 20, or cylindrical in shape, as indicated at 21. The two forms of head structure are illustrated in Figures 6 and 7 of the drawing.

The cleat protectors 14 are also provided with enlarged portions 22 at points intermediate their lengths and adjacent the portion thereof which will encompass the juncture point between the portions 12 and 13 of the cleat 11. Flexible cable links 23 interconnect the enlarged portions 22 which are in adjacent peripheral relation and each of the protectors 14 is provided with an integrally formed hook 24 at or near its inner end, the hooks 24 each engaging under and over a central portion of an adjacent cable 23.

In operation, it will be apparent that the device should be mounted upon a tire when the latter is in deflated condition and after the protectors have been properly positioned over the cleats of a tire, the tire may be again inflated after which the device will be held very securely in position upon the tire. It will also be apparent that when so positioned, the protectors 14 will act to again provide secure traction for the tire even though the cleats thereof may be worn partially away. It will also be apparent that the shape of the protectors 14 may be made to conform to the shape of the particular cleats of a tire and that the flexible cable links 19 and 23 will provide yieldable connection between the separate protector members 24 to securely but yieldably maintain the entire device upon the tire in proper position at all times.

While but one form of the invention has been shown and described herein, it will be readily apparent to those skilled in the art that many minor modifications may be made without departing from the spirit of the invention or the scope of the appended claim.

What is claimed is:

A device of the character described comprising, in combination with a tire having a carcass and a plurality of cleats formed on the outer periphery thereof, the provision of a hollow apertured metallic protector for each of said cleats, enlarged portions for each of said protectors, and at least two longitudinally extending flexible cables each interconnecting pairs of circumferentially aligned enlarged portions of alternate protectors, each of said protectors having a substantially inverted U-shaped cross sectional area, and said protectors each having the substantial contour of its associated cleat, said cables comprising headed rod members passing through said apertures, said heads engaging the inner sides of said inverted U, and wherein each protector includes a hook portion engaging the rod member interconnecting the protector on either side thereof intermediate the ends of said last-mentioned rod member.

ELMER E. DORAN.

References Cited in the file of this patent

UNITED STATES PATENTS

| Number | Name | Date |
|---|---|---|
| 1,258,863 | Brown | Mar. 12, 1918 |
| 1,673,655 | Weston | June 12, 1928 |
| 2,570,689 | Kennedy | Oct. 9, 1951 |

FOREIGN PATENTS

| Number | Country | Date |
|---|---|---|
| 45,188 | Norway | May 21, 1928 |
| 819,866 | France | Oct. 28, 1937 |